US007995227B2

(12) United States Patent
Perdu

(10) Patent No.: US 7,995,227 B2
(45) Date of Patent: Aug. 9, 2011

(54) OFFLINE MARKLESS POST PROCESSING OF PRINTED MEDIA

(75) Inventor: Patrick G. L. Perdu, Punterenas (CR)

(73) Assignee: Xerox Corporation, Stamford, CT (US)

( * ) Notice: Subject to any disclaimer, the term of this patent is extended or adjusted under 35 U.S.C. 154(b) by 1109 days.

(21) Appl. No.: 10/633,351

(22) Filed: Aug. 1, 2003
(Under 37 CFR 1.47)

(65) Prior Publication Data

US 2005/0044550 A1 Feb. 24, 2005

(51) Int. Cl.

| | |
|---|---|
| ***G06F 3/012*** | (2006.01) |
| ***G06F 13/00*** | (2006.01) |
| ***B41F 17/013*** | (2009.01) |
| *G06K 15/00* | (2006.01) |

(52) U.S. Cl. ..................... 358/1.15; 358/1.12; 358/1.16; 358/1.18; 358/1.1; 399/361; 399/407; 101/213; 101/225; 271/3.01; 271/3.14; 718/101; 718/102

(58) Field of Classification Search ........ 358/1.13–1.18, 358/304, 296, 1.1; 399/152, 407, 385, 8–16, 399/361, 107–113; 347/264; 101/226, 224; 270/18, 30.08, 19, 32, 52.01–52.09; 718/100–105; 226/24; 271/176, 207, 298, 3.14
See application file for complete search history.

(56) References Cited

U.S. PATENT DOCUMENTS

| | | | | |
|---|---|---|---|---|
| 4,891,681 | A * | 1/1990 | Fiske et al. | 399/385 |
| 5,129,568 | A * | 7/1992 | Fokos et al. | 226/27 |
| 5,193,727 | A * | 3/1993 | Crowley | 226/24 |
| 5,559,606 | A * | 9/1996 | Webster et al. | 358/296 |
| 5,628,574 | A * | 5/1997 | Crowley | 400/621 |
| 5,629,775 | A * | 5/1997 | Platteter et al. | 358/296 |
| 5,710,635 | A * | 1/1998 | Webster et al. | 358/296 |
| 5,794,830 | A * | 8/1998 | Crowley | 226/24 |
| 5,875,383 | A * | 2/1999 | Stemmle | 399/384 |
| 6,025,926 | A * | 2/2000 | Smith et al. | 358/1.18 |
| 6,324,353 | B1 * | 11/2001 | Laussermair et al. | 399/16 |
| 6,549,299 | B1 * | 4/2003 | Allen et al. | 358/1.18 |
| 6,616,135 | B1 * | 9/2003 | Shida et al. | 270/58.08 |
| 6,804,473 | B2 * | 10/2004 | Nakamura et al. | 399/16 |
| 6,856,412 | B1 * | 2/2005 | Kaneko | 358/1.14 |
| 6,917,437 | B1 * | 7/2005 | Myers et al. | 358/1.15 |
| 7,027,174 | B2 * | 4/2006 | Leyva | 358/1.15 |
| 7,040,820 | B2 * | 5/2006 | Perdu et al. | 400/76 |
| 7,054,028 | B2 * | 5/2006 | Murata | 358/1.16 |
| 2002/0018235 | A1 * | 2/2002 | Ryan et al. | 358/1.15 |
| 2002/0060388 | A1 * | 5/2002 | Wakabayashi et al. | 270/58.08 |
| 2003/0090715 | A1 * | 5/2003 | Yoshikawa | 358/1.15 |
| 2003/0222396 | A1 * | 12/2003 | Kurahashi et al. | 271/207 |

FOREIGN PATENT DOCUMENTS

EP 1293353 A2 3/2003

OTHER PUBLICATIONS

JP Patent Abstract 2002316460, Oct. 29, 2002, Fuji Xerox Co. Ltd.
JP Patent Abstract 2002273971, Sep. 25, 2002, Ricoh Co. Ltd.

* cited by examiner

*Primary Examiner* — Twyler L Haskins
*Assistant Examiner* — Chad Dickerson
(74) *Attorney, Agent, or Firm* — Perman & Green, LLP

(57) ABSTRACT

A method for printing media includes accumulating post processing instructions for printed media during printing operations, recording the post processing instructions on an information device, and playing back the post processing instructions for controlling offline post processing of the printed media.

12 Claims, 5 Drawing Sheets

OFFLINE MARKLESS POST PROCESSING OF PRINTED MEDIA

BACKGROUND

1. Field

The disclosed embodiments relate to image production and, more particularly, to a system and method for processing printed media.

2. Brief Description of Related Developments

In high speed continuous feed printing, one or more printing engines may be coupled directly to a number of post processors to perform operations after printing. These types of systems may be referred to as online post processing systems. In some cases, the actual post processing throughput may be limited by the printing operations throughput. In others, the post processing operations themselves may limit throughput because they may not be capable of processing printed media as fast as produced by the printing engines.

For high volume printing production, it may be cost efficient to de-couple printing operations from post processing operations. For example, printed media comprising individual pages or groups of pages referred to as jobs may be formed into a roll and transported to a separate station or area for post processing operations. At the post processing station each job is identified in order to perform operations such as cutting, slitting, stacking, folding, inserting into envelopes, weighing and stamping. This type of operation may be referred to as offline post processing. Offline post processing may allow for load balancing among a number of printing operations and among a number of post processing operations.

The actual post processing operations to be performed may be printed directly onto the printed media, for example, in the margin as a bar code, or other small marks on the media, that are read by the various off line post processing equipment as the media passes through the equipment. The operations may be in the form of information, commands, or messages, generally referred to as instructions. Some exemplary instructions may include:

- The page has been printed and must be processed; or the page has been ejected and should be discarded
- The page is part of a set and a given post processor action is to be performed when the set is complete. For example, "This is a mail message of three pages for John Doe, the next set is a mail message of two pages for Bill Smith; each is to be stapled, folded and inserted into different envelopes".
- The page was subject to a jam and the post-processor should stop when reaching it, and call for operator attention.
- The page length changes hereafter and the post-processor should (for example) adjust a cutting distance.
- The pages are provided solely for post-processor alignment and adjustment. They require: stop; call for operator attention and action, and they should be discarded afterwards.
- Where the post-processor is a folding machine used to fold booklets that are trimmed and sewn, commands may include the description of the folding pattern (the imposition pattern) and the direction of the page.

Other instructions may include a paper advance clock or a page break signal.

It would be advantageous to provide post processing instructions without marking the media.

SUMMARY

The disclosed embodiments are directed to printing and post processing media. In one embodiment, a method for printing media is disclosed including accumulating post processing instructions for printed media during printing operations, recording the post processing instructions on an information device, and playing back the post processing instructions for controlling offline post processing of the printed media.

In another embodiment, a method for printing media is disclosed including accumulating post processing instructions for printed media from a plurality of printing modules, recording the post processing instructions on an information device, transporting the information device with the printed media to an offline post processing system, and playing back the post processing instructions for controlling offline post processing of the printed media.

Yet another embodiment includes a printing system with an online printing/copying operation having a controller for determining post processing instructions for printed media and for recording the post processing instructions on an information device, and an offline post processing operation operable to play back the post processing instructions from the information device for controlling offline post processing of the printed media.

Still another embodiment includes a computer program product with a computer useable medium having computer readable code means embodied therein for causing a computer to print media. The computer readable code means in the computer program product includes computer readable program code means for causing a computer to accumulate post processing instructions for the printed media during printing operations, computer readable program code means for causing a computer to record the post processing instructions on an information device, and computer readable program code means for causing a computer to play back the post processing instructions for controlling offline post processing of the printed media.

BRIEF DESCRIPTION OF THE DRAWINGS

The foregoing aspects and other features of the present disclosed embodiments are explained in the following description, taken in connection with the accompanying drawings, wherein.

DETAILED DESCRIPTION OF THE PREFERRED EMBODIMENT(S)

Figure 1:
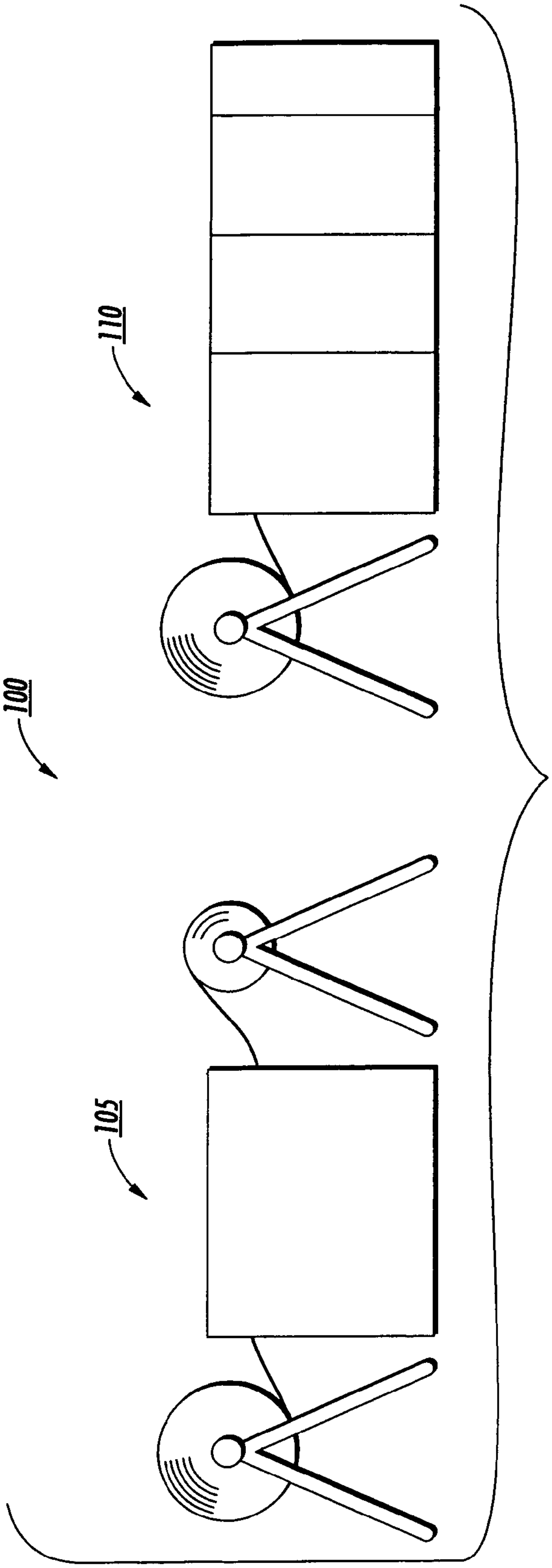
FIG. 1 is diagram of a printing/copying and post processing system incorporating features of the disclosed embodiments.

Referring to FIG. 1, a system 100 incorporating features of the disclosed embodiments is illustrated. Although the disclosed embodiments will be described with reference to the embodiment shown in the drawings, it should be understood that the disclosed embodiments can be embodied in many alternate forms of embodiments. In addition, any suitable size, shape or type of elements or materials could be used.

As shown in FIG. 1, system 100 is generally a printing system that includes a printing/copying system 105 and a post processing system 110. In one embodiment, the printing/ copying system comprises a xerographic printing/copying system, however, other printing and copying systems may also incorporate the features of the disclosed embodiments. For purposes of the description herein, post processing system 110 is shown separate from printing/copying system 105, and thus post processing system 110 may be referred to as "offline" while printing/copying system 105 may be referred to as "online."

Referring to FIG. 1, printing/copying system 105 generally provides a printing function where images are applied to a suitable media. Post processing system 110 is adapted to perform various operations on the printed media, for example, cutting, stacking, stapling, folding, inserting into envelopes, weighing and stamping.

It is a feature of the disclosed embodiments to provide an online recording and an offline playback of post processing instructions that provides post processing instructions without marking the media.

Figure 2:
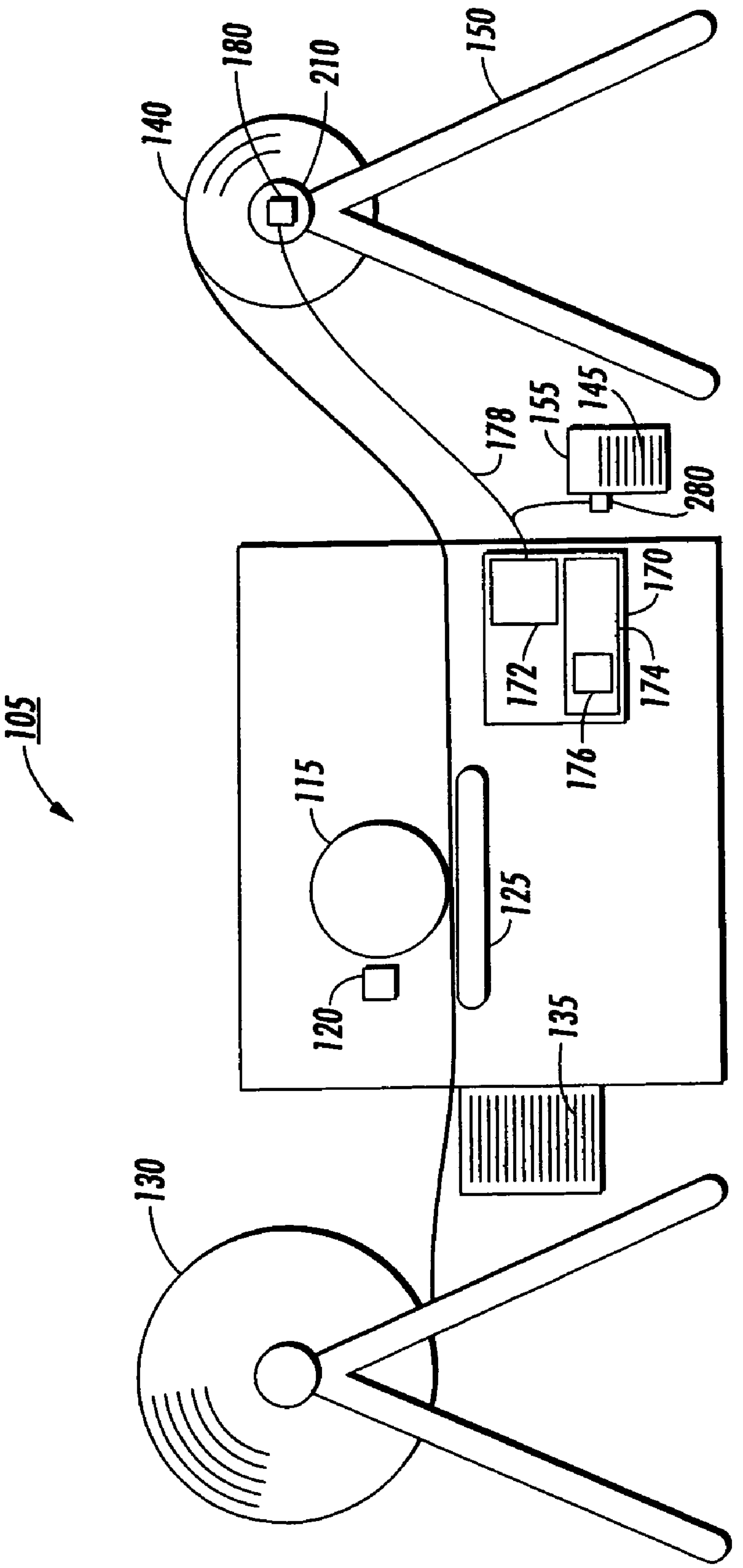
FIG. 2 is a schematic diagram of a printing/copying system in accordance with the disclosed embodiments.

As shown in FIG. 2, one embodiment of printing/copying system 105 includes an imaging drum 115, a marking device 120 and a first media transport device 125. Media to be printed upon may be in any suitable form, for example, a continuous roll 130, or a stack of one or more sheets 135. First media transport device 125 operates to convey media 130, 135 to imaging drum 115. Marking device 120 is adapted to apply images to imaging drum 115 which operates to apply the images to media 130, 135. First media transport device 125 then operates to convey the printed media 140, 145 to a suitable holding device, for example, a rack 150 or bin 155. Alternately, other suitable devices may be utilized for producing printed media 140, 145.

Figure 3:
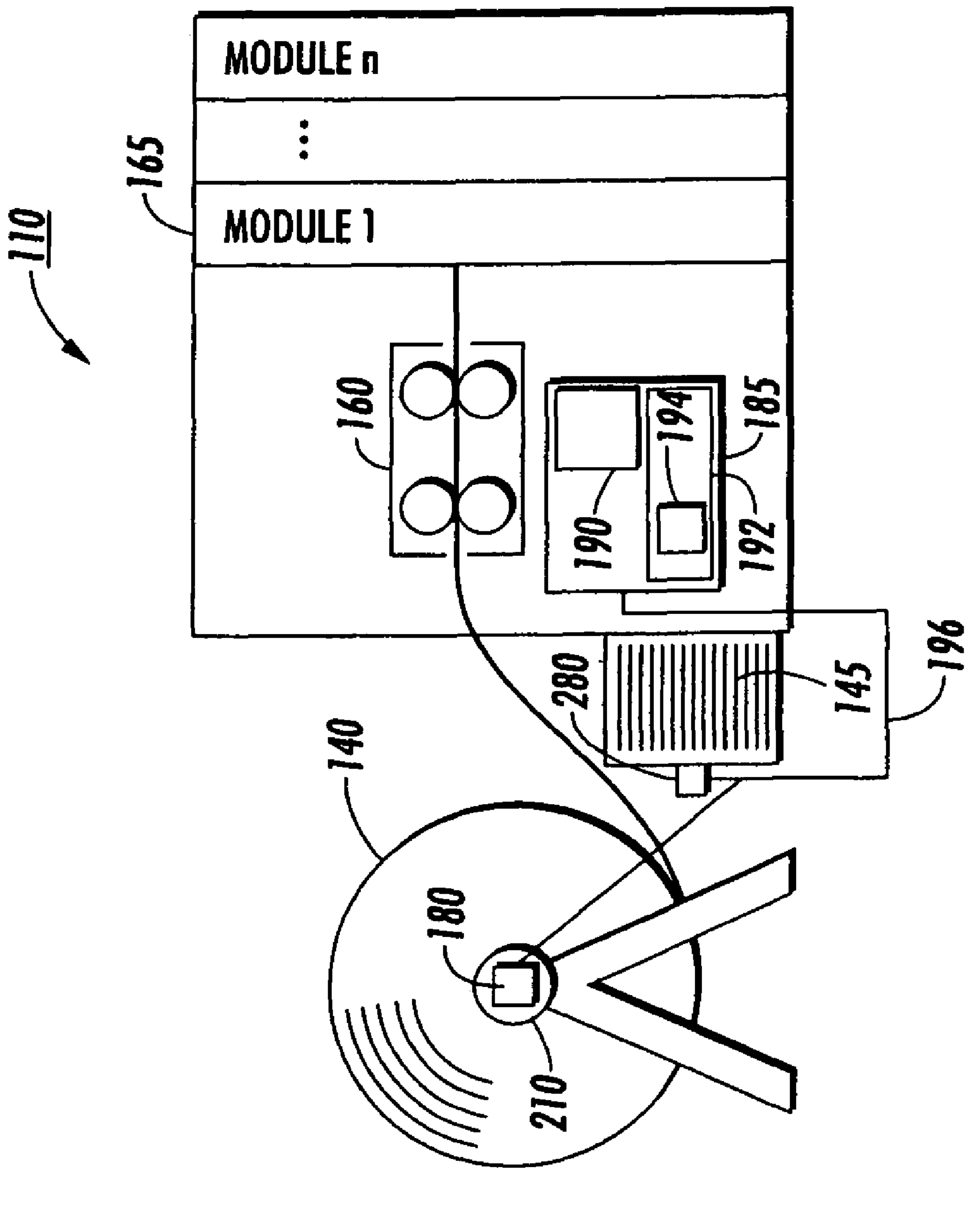
FIG. 3 is a schematic diagram of a post processing system in accordance with the disclosed embodiments.

One embodiment of post processing system 110 is shown in FIG. 3 and includes a second media transport device 160 and one or more post processing devices or modules $165_1 \ldots 165_n$. Second media transport device 160 operates to convey printed media, for example, in the form of a continuous roll 140 or separate sheets 145, to the one or more post processing modules $165_1 \ldots 165_n$. Post processing modules $165_1 \ldots 165_n$ generally include various devices for treating or handling printed media 140, 145 for example, cutting, stacking, stapling, folding, inserting into envelopes, weighing and stamping, as mentioned above. Post processing modules $165_1 \ldots 165_n$ may be arranged in parallel, sequentially, any combination of sequential and parallel arrangements, or in any other suitable manner.

In the presently disclosed embodiments, one example of online recording and an offline playback of post processing instructions includes recording post processing instructions for printed media 140, 145 on a storage device, transporting the storage device with the printed media to post processing system 110 and utilizing the instructions stored in the storage device to direct post processing operations for printed media 140, 145. Returning to FIG. 2, printing/copying system 105, imaging drum 115, marking device 120 and first media transport device 125 may be operated by a first controller 170. First controller 170 may include logic circuitry for generally controlling the operation of printing/copying system 105, and for determining post processing instructions. First controller 170 may include a first processor 172 that operates programs in a first memory device 174.

First memory device 174 may also include one or more first program storage devices 176 for storing data, software, and computer programs incorporating procedures to be executed by first processor 172. The software and computer programs may be in the form of machine readable program source code. First controller 170 may be generally adapted to utilize first program storage devices 176 embodying the machine readable program source code to operate printing/copying system 105 according to the disclosed embodiments. First program storage devices 176 may include magnetic, optical, semiconductor, or any other type of suitable media.

Printing/copying system 105 may also include a first link 178 between first controller 170 and an information device 180. First link 178 may include any suitable link for providing a communications path between first controller 170 and information device 180, 280 for example, an optical, infrared, wired, wireless, network, Local Area Network (LAN), Wide Area Network (WAN), virtual private network (VPN), or Public Switched Telephone Network (PSTN) based link, or a link using any other suitable technology.

Information device 180, 280 may be any device capable of communicating with first controller 170, storing instructions or information related to post processing operations to be performed on printed media 140, 145, and playing that information back or otherwise presenting that information to offline post processing operation 110.

For example, information device 180, 280 may comprise a memory device, an RF programmable memory device, a contact programmable memory device, also referred to as an iButton™, an optical device, a radio frequency identification device, a lasing or laser responsive device, or any other suitable device. Information device 180, 280 may be generally arranged to accompany printed media 140, 145 to post processing system 110. Accordingly, information device 180 may be located with, or attached to, rack 150, bin 155, a spool 210, or may be otherwise adapted to be conveyed to post processing system 110. Alternately, information device 180, 280 may be located on, or connected to, a first network (not shown) accessible by post processing system 110.

Turning to FIG. 3, post processing system 110 includes a second controller 185 for controlling second media transport device 160 and post processing modules $165_1 \ldots 165_n$. Second controller 185 may include logic circuitry for generally controlling the operation of post processing system 110, and may comprise a second processor 190 and a second memory device 192.

Second memory device 192 may store data, software, and computer programs incorporating procedures to be executed by second processor 190. Second memory device 192 may provide this storage as part of one or more second program storage devices 194. The software and computer programs may be in the form of machine readable program source code. Second controller 185 may be generally adapted to utilize second program storage devices 194 embodying the machine readable program source code to operate post processing system 110 according to the disclosed embodiments. Magnetic, optical, semiconductor, or any other type of suitable media may be utilized by second program storage devices 194.

Post processing system 110 may also include a second link 196 for providing a communication path between second controller 170 and information device 180, 280. Second link 196 may include any suitable link for providing such a communications path and may be similar to first link 178 (FIG. 2). Second link 196 is generally adapted to convey post processing information from information device 180, 280 to second controller 185.

In accordance with the disclosed embodiments, printing/copying system 105 prints images on media 130, 135, identifies pages, groups of pages, or jobs, and records post processing operations onto information device 180, 280. When printed media 140, 145 is ready to be post processed, the post processing instructions are then played back to post processing system 110. The recording operation may occur before, during or after printing.

In one example, post processing instructions may be recorded on information device 180, 280 by first controller 170 while printed media 140 is wound into a roll on a rewinder (not shown) at the end of printing/copying system 105. Printed media 140 may then be mounted on an unwinder (not shown) where the jobs are provided in reverse order to post processing system 110. Second controller 185 may read the post processing instructions from information device 180, 280 in the same reverse order and provide them to post processing system 110.

Figure 4:
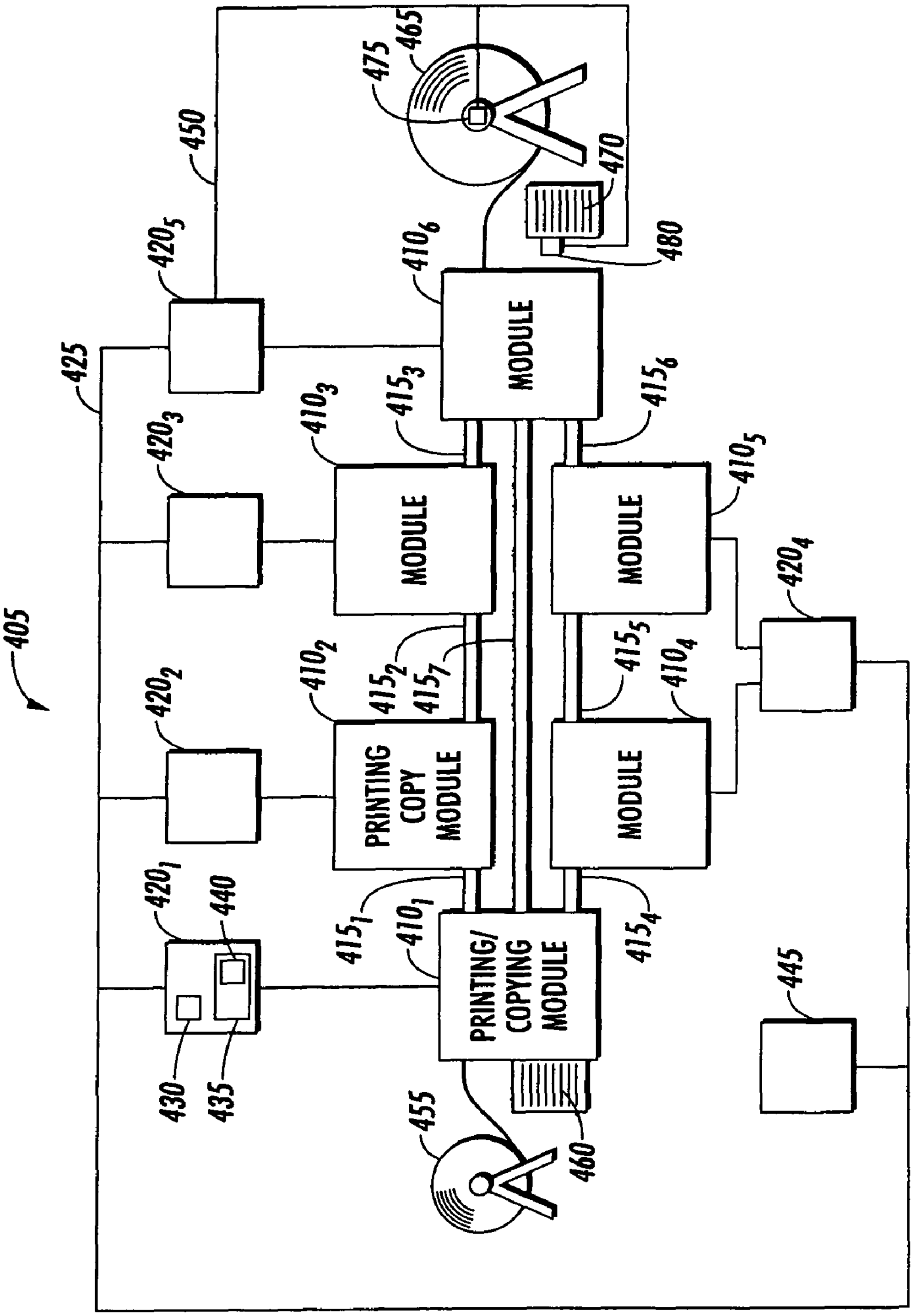
FIG. 4 is a schematic diagram of a networked printing/copying system in accordance with the disclosed embodiments.
Figure 5:
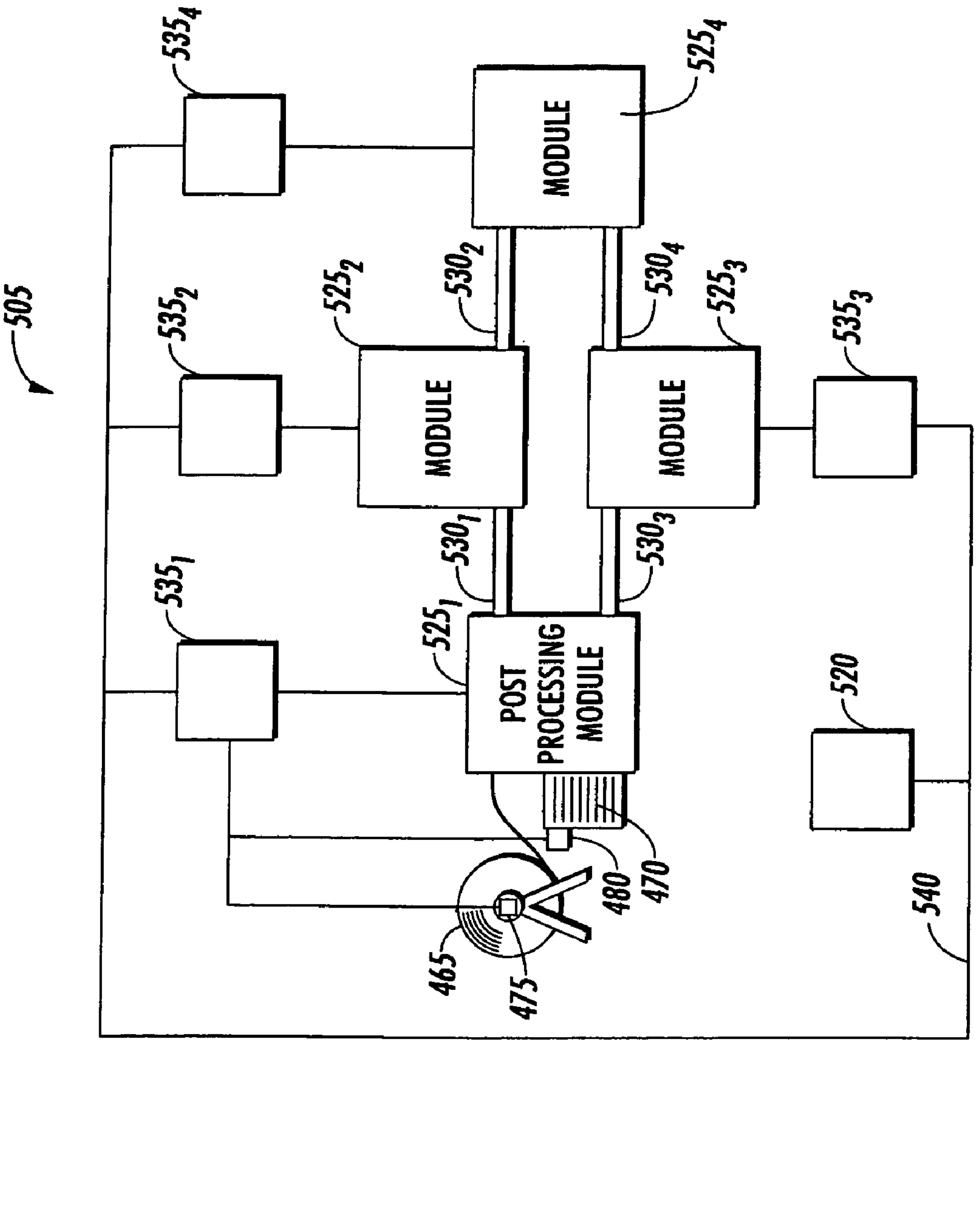
FIG. 5 is a schematic diagram of a networked post processing system in accordance with the disclosed embodiments.

FIGS. 4 and 5 show schematic diagrams of additional examples of printing/copying and post processing systems according to the disclosed embodiments. In the exemplary system of FIG. 4, a copying/printing system 405 is comprised of a printer controller 445 and printing/copying modules 410$_1$ . . . 410$_6$ coupled together by paper path segments 415$_1$ . . . 415$_7$. Media, for example, in the form a roll 455 or in sheets 460, may be fed into a first printing/copying module 410$_1$ and conveyed to other printing/copying modules 410$_2$ . . . 410$_6$ by paper path segments 415$_1$ . . . 415$_7$. Paper path segments 415$_1$ . . . 415$_7$ may be collectively referred to as the paper path 415. Each printing/copying module 410$_1$ . . . 410$_6$ may perform a different printing/copying function. When printing/copying is complete, printed media may be collected as a printed roll 465 or a printed stack of sheets 470.

Each printing/copying module 410$_1$ . . . 410$_6$ may be individually controlled by a network device 420$_1$ . . . 420$_5$. In this example, printing/copying modules 410$_4$ and 410$_5$ are controlled by the same network device 420$_4$. Each network device 420$_1$ . . . 420$_5$ may communicate with its corresponding printing/copying module using signals and timing specific to the particular module.

Referring to network device 420$_1$ as an example, each network device 420$_1$ . . . 420$_5$ may include a processor 430 and a memory storage 435. Network devices 420$_1$ . . . 420$_5$ and printer controller 445 may generally be coupled together for power and communication by a network 425. Communication over network 425 may be based on a serial protocol that supports real-time and intrinsic security features. In one embodiment the combination of network devices 420$_1$ . . . 420$_5$ and network 425 may generally be referred to as a Print Line Bus™ (PLB 430). Network devices 420$_1$ . . . 420$_5$ may communicate using a common PLB language based on real-time messaging.

PLB 430 may be adapted to generally coordinate all the real time print line handling aspects of copying/printing system 405, including provide a communication path among network devices 420$_1$ . . . 420$_5$, and providing a filtering capability, that is, PLB 430 may operate to isolate selected individual ones or selected groups of network devices 420 from each other. PLB 430 may also operate to synchronize paper masters, other intermediate printing substrates, and other system devices, and may further operate to synchronize copying/printing data with the paper path of associated documents.

In accordance with the present embodiments, each network device 420$_1$ . . . 420$_5$ may include a buffer 440 to store post processing instructions from other network devices 420$_1$ . . . 420$_5$, for example, those upstream in the printing/copying process, or from printing/copying modules 410$_1$ . . . 410$_6$.

For example, printing/copying and post processing instructions for a particular print job may be conveyed by printer controller 445 to network device 420$_1$ which may control the first printing operations. The print job may be routed to various printing/copying modules 410$_1$ . . . 410$_6$ according to the printing operations to be performed. As the print job progresses through each of its printing operations the associated network device 420 may receive post processing instructions from the network device 420 controlling the previous printing operation, and may attach additional post processing instructions. The print job and its post processing instructions may be passed from network device to network device until reaching the last printing/copying module, for example 410$_6$ and its corresponding network device 420$_5$.

Network device 420$_5$ may include a third link 450, similar to first link 178 (FIG. 2) that couples network device 420$_5$ to an information device 475, 480 similar to information devices 180, 280. Network device 420$_5$ operates to record any accumulated post processing instructions, including instructions that may result from printing/copying operations performed by network device 420$_5$, onto information device 475, 480.

FIG. 5 shows a schematic diagram of an exemplary post processing system 505 according to the disclosed embodiments. In this example, post processing system 505 comprises a controller 520 and post processing modules 525$_1$ . . . 525$_4$ coupled together by paper paths 530$_1$ . . . 530$_4$. Printed media 465, 470 may be fed into a first post processing module 525$_1$ and conveyed to other post processing modules 525$_2$ . . . 525$_4$ by paper paths 530$_1$ . . . 530$_4$. Each post processing module 525$_1$ . . . 525$_4$ may perform a distinct post processing task or function.

Each post processing module 525$_1$ . . . 525$_4$ may be individually controlled by a network device 535$_1$ . . . 535$_4$ which may be similar to network devices 420$_1$ . . . 420$_5$ (FIG. 4). In this example, network devices 535$_1$ . . . 535$_4$ are connected by a PLB 540, similar to PLB 430 (FIG. 4). At least one of the post processing modules 525$_1$ . . . 525$_4$, in this example post processing module 525$_1$, may include a fourth link 540, similar to first link 178 (FIG. 2).

Printed media 465, 470 is conveyed to post processing system 505 where link 540 conveys post processing instructions from information device 475, 480 to post processing module 525$_1$. Printed media 465, 470 may then be routed among post processing modules 525$_1$ . . . 525$_4$ for post processing operations. Post processing instructions are routed to the network devices 535$_1$ . . . 535$_4$ corresponding to the modules performing post processing operations.

The disclosed embodiments are advantageous because they allow for mark-less offline post processing. The automatic re-qualification of the pages removes (a) the need for a separated file storage and (b) the risk of recalling a wrong file. The disclosed embodiments provide a very low cost solution, especially since the PLB's 425, 540 also perform devices interfacing, synching and segmentation.

While particular embodiments have been described, various alternatives, modifications, variations, improvements, and substantial equivalents that are or may be presently unforeseen may arise to Applicant or others skilled in the in the art. Accordingly, the appended claims as filed and as they may be amended are intended to embrace all such alternatives, modifications, variations, improvements and substantial equivalents.

What is claimed is:

1. A method of printing media comprising:

accumulating post processing instructions for printed media during printing operations;

wirelessly recording the post processing instructions on a transportable electronic information device located on a spool, while winding the printed media around the spool, without marking any media with the post processing instructions;

transporting the electronic information device on the spool holding the printed media from an online printing/copying system where the printing operations occur to a separate offline post processing system where the post processing occurs; and wirelessly playing back the post processing instructions from the information device on the spool at the offline post processing system for controlling offline post processing of the printed media while the media is unwound from around the spool.

2. The method of claim 1, wherein accumulating post processing instructions comprises compiling post processing instructions from each of a plurality of printing modules.

3. The method of claim 1, wherein recording the post processing instructions comprises:

conveying the accumulated post processing instructions to an individual one of a plurality of printing modules; and recording the accumulated post processing instructions by way of a link between the individual one printing module and the information device.

4. The method of claim 1, wherein playing back the post processing instructions comprises:

conveying the post processing instructions from the information device through a link to the post processing system; and routing the post processing instructions to one or more post processing modules for performing the offline post processing.

5. A printing system comprising:

an online printing/copying operation having a controller for determining post processing instructions for printed media and for wirelessly recording the post processing instructions on a transportable electronic information device positioned on a spool of the printed media, while winding the printed media around the spool, without marking the post processing instructions on any media; and an offline post processing operation configured to wirelessly play back the post processing instructions from the transportable electronic information device on the spool for controlling offline post processing of the printed media while the media is unwound from around the spool, wherein the spool is configured for conveying the printed media and the transportable electronic information device together from the online printing/copying operation to the offline post processing operation.

6. The printing system of clam 5, wherein the online printing/copying operation further comprises a plurality of printing modules, and the post processing instructions are compiled from each of the plurality of printing modules.

7. The printing system of clam 6, further comprising:

a final printing module where post processing instructions are accumulated from the plurality of printing modules; and a link for recording the accumulated post processing instructions from the final printing module to the information device.

8. The printing system of clam 5, wherein the offline post processing operation further comprises:

one or more post processing modules for performing the offline post processing;

a link, connected to at least one of the one or more post processing modules for playing back the post processing instructions for use by the one or more post processing modules.

9. A non-transitory computer useable medium having computer readable code means embodied therein for causing a computer to print media, the computer readable code means comprising:

computer readable program code means for causing a computer to accumulate post processing instructions for the printed media during printing operations;

computer readable program code means for causing a computer to wirelessly record the post processing instructions on a transportable electronic information device positioned on a spool of the printed media, while winding the printed media around the spool, without marking the post processing instructions on any media; and computer readable program code means for causing a computer to wirelessly play back the post processing instructions from the information device for controlling offline post processing of the printed media while the media is unwound from around the spool after the electronic information device together with the printed media has been transported on the spool from an online printing/copying system where the printing operations occur to a separate offline post processing system where the offline post processing occurs.

10. The computer useable medium of claim 9, wherein the computer readable program code means for causing a computer to accumulate post processing instructions comprises computer readable program code means for causing a computer to compile post processing instructions from each of a plurality of printing modules.

11. The computer useable medium of claim 9, wherein the computer readable program code means for causing a computer to record the post processing instructions comprises:

computer readable program code means for causing a computer to convey the accumulated post processing instructions to an individual one of a plurality of printing modules; and computer readable program code means for causing a computer to record the accumulated post processing instructions by way of a link between the individual one printing module and the information device.

12. The computer useable medium of claim 9, wherein the computer readable program code means for causing a computer to play back the post processing instructions comprises:

computer readable program code means for causing a computer to convey the post processing instructions from the information device through a link to the post processing system; and computer readable program code means for causing a computer to route the post processing instructions to one or more post processing modules for performing the offline post processing.

* * * * *